United States Patent [19]

Cerboni

[11] Patent Number: 4,588,599

[45] Date of Patent: May 13, 1986

[54] METHOD OF CASTING CHOCOLATE

[75] Inventor: Renzo Cerboni, Milan, Italy

[73] Assignee: Carle & Montanari S.p.A., Milan, Italy

[21] Appl. No.: 643,003

[22] Filed: Aug. 21, 1984

[30] Foreign Application Priority Data

Feb. 9, 1984 [IT] Italy ................ 19532 A/84

[51] Int. Cl.⁴ ............................................ A23G 1/21
[52] U.S. Cl. ................................ 426/515; 425/218; 426/660
[58] Field of Search ............... 426/512, 515, 660, 631; 425/218, 219, 256, 259, 261

[56] References Cited

U.S. PATENT DOCUMENTS 4,382,968  5/1983  Akutagawa .................. 426/660
4,477,473  10/1984  Schoonmaker et al. ........... 426/515

Primary Examiner—George Yeung
Attorney, Agent, or Firm—Ladas & Parry

[57] ABSTRACT

A forming machine for chocolate has a distributor bottom plate formed with a discharge manifold channel into which there open, through interconnecting grooves, the blind holes aligned with overlying delivery holes in the forming machine. The discharge manifold channel is connected to an excess chocolate recovery portion selectively conducting to either an intermediate storage or feeding hopper of the forming machine. In the course of the casting process implemented thereby, all of the pistons, irrespective of their being reciprocating or rotary ones, are fed at all times independently of the molds being used. In moving from one mould to another, only the distributor bottom plate is replaced and no pistons need be manipulated.

7 Claims, 6 Drawing Figures

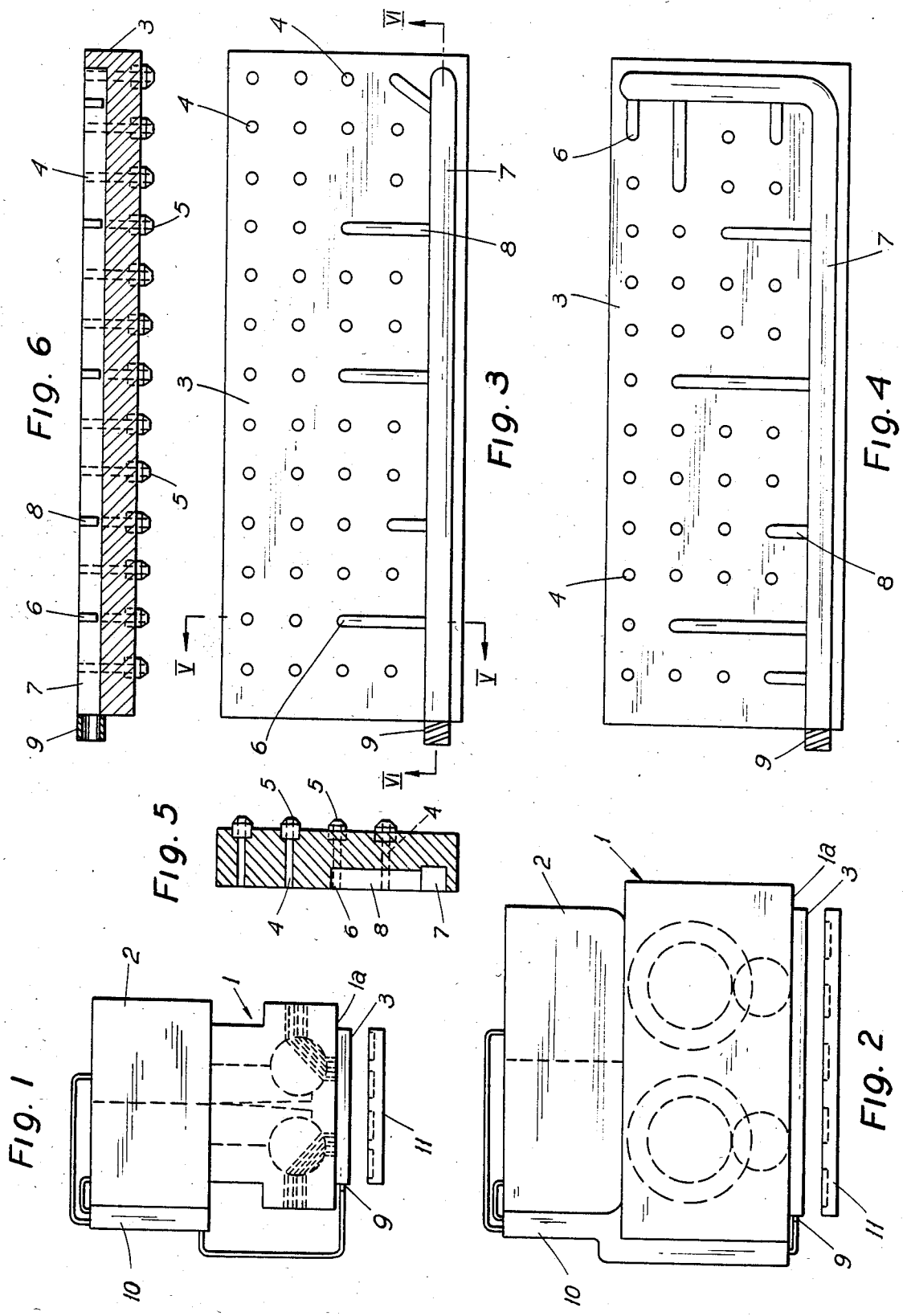

METHOD OF CASTING CHOCOLATE

BACKGROUND OF THE INVENTION

This invention relates to a method of casting chocolate, cream, and the like products, and to a forming machine and bottom plate for implementing the method.

As is known, for casting chocolate, cream, candy, and the like products with either of the two most commonly used methods, i.e. spot and continuous casting, it has been heretofore possible to employ forming machines of two types, namely reciprocating piston and rotary piston forming machines.

Irrespective of its design, each forming machine is provided with an equal number of chocolate delivery holes to the number of reciprocating or rotary pistons it comprises. In order to be able to use one forming machine with different master molds, i.e. molds having either a different number of receptacles or the same number of differently patterened receptacles, or again, to produce different chocolate articles with one master mold, it is known to associate with the bottom delivery end of the forming machine distributor bottom plates having inlet holes which correspond by number and arrangement to the forming machine delivery holes. Also known is to arrange said holes of the bottom plates in a branched pattern such that a greater number of mold receptacles can be filled with respect to the forming machine delivery holes, and accordingly, the product can be distributed more evenly to the mold receptacles, especially where large surface receptacles are used, as for bars and the like. In each case, those pistons which happen to be in communication with forming machine delivery holes not controlled to deliver chocolate for the time being, must be stopped or somehow prevented from delivering chocolate while the machine is in operation.

Thus, whenever the number of the delivery holes being utilized changes in the forming machines, it becomes necessary to manipulate prior forming machines, whether of the reciprocating or rotary piston types, in two ways, namely, 1. pistons associated with inoperative delivery holes must be deactivated; and
2. a bottom plate must be mounted in the machine as required for each case.

While replacement of the bottom plate takes place essentially in the same way for reciprocating piston forming machines as for rotary piston ones, pistons are deactivated in different ways. With reciprocating piston forming machines which have their pistons in communications through rotary shut-off valves, ineffectual pistons are deactivated by inserting elements of cancellation of the piston movements in the form of combs or strips. In the instance of rotary piston forming machines, selected pistons are deactivated by matching apertures in the axial strips which are inserted through the machine rotor to act as continuous rotary pistons.

Although different in principle, the forming or casting methods of reciprocating piston and rotary piston machines share continuous supply of fluidized chocolate to all the piston chambers in the machine, and delivery of the fluidized chocolate to just those piston chambers which have their pistons activated at any one time.

The disadvantages of prior casting methods and machines are well known to the skilled ones, and no efforts have been spared to arrive at a solution, albeit a partial one, and improve the machines output rates while ensuring as accurate metering as feasible, to thus fill a generally felt need.

An accurate metering action is of the utmost importance for the output rate of chocolate forming machines, because many countries enforce strict specific regulations and because, owing to the very large daily output of such machines, even a few grams or fractions added to the nominal weight to meet tolerance requirements safely, may result by the end of a day in considerable amounts of a valuable product being wasted and unpaid for by the purchaser.

Listed briefly here below are the disadvantages and deficiencies of prior reciprocating piston forming machines both as regards their methods of operation and changing from one mold type to another.

Owing to the different time durations of the piston operation cycles, the pistons are subjected to differential wear rates; this results in less than satisfactory volumetric efficiencies of the various cylinder-piston units, because that efficiency would depend both on the chocolate viscosity and a tight seal and control of any play that might develop.

If such plays, or wear rates, reach a significant value, air may be drawn into the chocolate being drawn into the cylinder-piston units, and result in a much feared formation of air bubbles within the chocolate itself.

Deactivation of the ineffectual pistons requires that an appropriate comb be selected from those available and installed. In the event of a wrong selection of the comb, which cannot be entirely ruled out on account of this being a manual operation, considerable damage may be caused, such as breakage of the safety pins, or if the latter fail to break, breakage of the bottom plate and waste of both valuable product and time, or production losses. The very handling of such combs mat prove a difficult task with large size forming machines, which may have several hundred cylinder-piston units and involve, therefore, the use of combs of considerable size and weight.

A more frequently occurring error is that of deactivating one or some of the pistons. In that case, the back-pressure due to the chocolate being delivered by the non-deactivated piston impacting on a solid area of the bottom plate is inadequate to operate the related safety pin(s) but is sufficient to cause local sagging of the plate which is already weakened by the various channels and holes formed therein. Thus, a gap is formed between the bottom surface of the grinder and bottom plate, wherethrough the chocolate would leak out and over the surface of the bottom plate in between the various receptacles to connect together adjoining receptacles with a film of chocolate. This results in heavier products and attendant economical loss for the producer, while it also adversely affects subsequent processing steps, such as shaking the articles out of the molds, packaging them, etc.

Within the forming machine itself, there occurs disuniform flowability, or viscosity, of the chocolate owing to the different temperatures of the piston units and during the chocolate drawing phase into the piston and valve conduits the fluidized chocolate flows into by gravity and remains there during all the time when the moulds are being used. On replacing the molds, the chocolate left there must be preliminarly removed by the operator and aggravates downtime.

Pressure irregularities within the forming machine, and consequently, possible uneveness of metering.

Considerable overall time expended to perform the various manual operations for switching from one mold type to another.

Rotary piston forming machines have on the other hand the following drawbacks.

Time requirements for replacing a strip forming the rotary pistons with any other strip, as the occasion may dictate.

Presence in the continuous deactivated chambers of a mass of inactive chocolate and, as a consequence, pressure differentials between the pressures in the delivering chambers and the deactivated ones, with attendant risk of chocolate leaking from the activated chambers into the deactivated ones, and again, of uneven metering.

Owing to the residence of chocolate inside the deactivated chambers, viscosity differentials may occur and propagate into the common mixing chamber, and hence into the metering chambers.

As regards replacement of the distributor bottom plates, this is carried out in the same manner for both forming machine types.

SUMMARY OF THE INVENTION

It is a primary object of this invention to provide a forming method for forming machines, both of the reciprocating and rotary piston types, as well as a forming machine and bottom plate, which can afford, (a) more uniform condition of chocolate processing and casting within the forming machine, and this regardless of the pistons deactivated or left inoperative;

(b) drastic reduction of the forming machine adaptation time and operations, since it would only be necessary to replace the bottom plate, without any further manipulation of the pistons; and (c) elimination of all probabilities for a human error in setting up the machine.

This object is achieved, according to this invention, by providing a forming and casting method for chocolate, cream, candy, and the like forming machines, which comprises a step of fluidized chocolate feeding into the metering chambers or cylinders, as well as a subsequent casting step, and is characterized in that:

(A) during the chocolate feeding step, said chocolate is always fed into all the metering chambers or cylinders;

(B) during the delivery step, chocolate is delivered from all the delivery holes of the forming machine;

(C) concurrently with the delivery step, a continuous excess chocolate discharge step takes place over the amount required to fill the molds being activated; and (D) a step of recovery of said excess chocolate is provided.

Advantageously, according to the invention, the excess chocolate may be selectively returned to a buffer storage tank or be cycled back into the forming machine feed-in hopper.

According to the invention, the forming machine is characterized in that it comprises, associated with a bottom plate, a recovery system for chocolate fed in excess to said bottom plate operating in connection with activated ones of said molds.

According to the invention, moreover, the bottom plate for this method and forming machine is characterized in that it includes at least one discharge manifold channel whereto inactive delivery holes of the forming machine for molds being used open through connection grooves, the discharge manifold channel having at least one discharge fitting for connection of said discharge manifold channel to the excess chocolate recovery system.

Also according to this invention, said discharge manifold channel may comprise a groove open at the top in said bottom plate, the closed side of said groove being formed by the forming machine delivery bottom end. Alternatively, said manifold channel may be split, i.e. located partly on the top side and partly on the bottom side of the bottom plate where required for flow rate reasons. The manifold channel portion located on the bottom side of the bottom plate would be appropriately closed by a cover plate.

The method, forming machine, and bottom plate of this invention afford advantages both as regards processing i.e. chocolate handling, and functionality and operation of the forming machine in switching from one mold type to other molds. As for the casting method, this takes place in improved conditions within the forming machine, both as regards viscosity uniformity and the distribution of pressures and temperatures, thus removing the disadvantages listed hereinabove of uneven metering, chocolate leakage, etc. At the same time, the operator's time is drastically reduced, he being just required to change the bottom plate, and relieved of any task as regards the pistons. Thus, material replacement of the combs is made unnecessary, and the attendant human errors eliminated, while unnecessary is made operation of the hooking devices for pistons to be deactivated, which as is brought forth by actual practice, is also heavily dependent on human error and leads to the problems specified hereinabove.

A further advantage of this invention is that it is quite easy to incorporated to existing machines, since it will be sufficient to associate with the forming machine body the circuit portion of the recovery conduit, which may then open selectively into a buffer or intermediate storage tank, or directly into the forming machine hopper. Advantageously, ancillary heating and pumping devices are provided for the chocolate cycled back.

Another advantage is that the bottom plates of this invention may have the same dimensions as currently known distributor bottom plates, or the same space requirements.

BRIEF DESCRIPTION OF THE DRAWINGS

Further features, advantages and details of the casting method, forming machine, and bottom plate according to this invention will be more clearly understood from the following description with reference to the accompanying drawing, where the invention has been illustrated in accordance with some exemplary embodiments thereof, and where:

FIG. 1 is a general view of a reciprocating piston forming machine having a bottom plate and recovery system according to this invention;

FIG. 2 is a general view similar to FIG. 1, showing a rotary piston forming machine;

FIGS. 3 and 4 are top plan views of two bottom plates according to the invention; and FIGS. 5 and 6 are, respectively, sectional views taken along the lines V—V and VI—VI of FIG. 3.

DESCRIPTION OF THE PREFERRED EMBODIMENT

In the drawing views, where similar parts are identified by the same reference characters, the numeral 1 designates a reciprocating piston forming machine in FIG. 1, and a rotary piston one in FIG. 2. The upper area of the machine includes a hopper 2, and the lower portion a distributor or continuous discharge bottom plate 3 according to the invention. Such plates are formed, in a manner known per se, with plural casting holes 4 which correspond by both number and arrangement to delivery holes open at the bottom end 1a of the forming machine 1, and have delivery nozzles 5 mounted at the opposite ends thereof. Indicated at 6 are blind holes adapted to correspond to those delivery holes in the forming machine whose pistons are to be deactivated or controlled to remain inoperative. According to the invention, said blind holes 6 are connected to a discharge manifold channel 7 by means of connecting grooves 8. Both the manifold channel 7 and connecting grooves 8 are in the form of open top troughs, the tops whereof are covered by said bottom end 1a of the forming machine 1 with the bottom plate 3 fastened thereto. Indicated at 9 is a junction passageway connecting said manifold channel 7 to the portion 10 of the excess chocolate recovery system, said recovery system portion 10 being schematically represented as associated with the forming machine 1 and opening upwardly into the feeding hoppers thereof.

In the event that a large number of pistons are to be deactivated, which may amount to about one third of the piston total, the manifold channel 7 may be fabricated with an increased cross-sectional area, and in order to avoid increasing the overall dimensions of the bottom plate 3, the same may be provided only in the top side of the bottom plate 3, as shown, or also in the bottom side thereof. In the latter case, the bottom manifold channel would be covered by a backplate, no further illustrated.

The bottom plate and recovery system according to the invention implement, therefore, a casting method whereby all of the pistons, whether reciprocating or rotary ones, can deliver chocolate irrespective of the bottom plates 3 being used, or irrespective of the molds being used and schematically indicated at 11 in the drawing. In conjunction with the metering step a continuous discharge step takes place, therefore, of the excess chocolate, which through the recovery system portion 10, may be selectively conducted either to the feeding hoppers 2 of the forming machine 1 or to a buffer storage tank, not shown. Thus, on the metering device interior, there will at all times prevail the preset optimum uniformity conditions both as relates to viscosity and pressures and temperatures, thereby perfect metering is ensured.

It may be appreciated from the foregoing that the method, forming machine, and bottom plate proposed effectively achieve the objects of this invention and cited advantages thereof.

In particular, drastically reduced is the adaptation time for switching from one mold size to another, human errors are avoided and inherent economical losses prevented, and the operating conditions optimized irrespective of the molds being used.

In order to promote chocolate flow into the discharge channel of the bottom plate, the bottom side thereof may be made arcuate, as may the top side therefor, formed on the forming machine, such as to avoid creating possible stagnation pockets at the corners of said discharge channel. The discharge channel may extend parallel to or adjacent one or more sides of the plate. A detailed description of the buffer storage tank and of the ancillary heating and circulating means in the recovery system portion 10 has been omitted because these are well within the capabilities of a skilled person in the art, and unrelated to this invention.

All of the parts may be modified or replaced with other technically and/or function-wise equivalent parts, without departing from the true scope of the instant invention.

All of the features set forth in the specification, appended claims, and accompanying drawing are substantial to this invention, either individually or in any mutual combinations.

I claim:
1. A method of casting chocolate comprising the steps of:
    (A) feeding fluidized chocolate into a metering device of a forming machine; said metering device having either reciprocating or rotary piston chambers which open into a plurality of delivery holes in the forming machine, the lower portion of the forming machine includes a bottom plate;
    said bottom plate being formed with a discharge manifold channel into which there open, through connection grooves, a plurality of nozzles aligned with said delivery holes;
    said discharge manifold channel extending annularly around the periphery of said bottom plate and having at least two spaced apart connection passageways for connection to an excess chocolate recovery system associated with the forming machine;
    (B) delivering chocolate from all of the delivery holes of the forming machine into molds through said plurality of nozzles;
    (C) continuously discharging excess chocolate over an amount required to fill said molds; and
    (D) recoverying said excess chocolate from said bottom plate.
2. A method according to claim 1, wherein during the excess chocolate recovery step (D), said chocolate is selectively fed into either a buffer storage tank or a forming machine feed-in hopper.
3. A method according to claim 1, wherein said discharge manifold channel extends parallel to a longitudinal side of said bottom plate in the proximity thereof.
4. A method according to claim 1, wherein said discharge manifold channel extends parallel to at least two sides of said bottom plate in the proximity thereof.
5. A method according to claim 1, wherein said discharge manifold channel is a split construction, formed partly in the upper side and partly in the lower side of the bottom plate, a cover plate closing said lower portion of said discharge manifold channel from below, and said discharge manifold channel having interconnecting holes and passageways for connection to said excess chocolate recovery system.
6. A method according to claim 1, wherein a bottom side of said discharge manifold channel is arcuate.
7. A method according to claim 6 wherein a top side of said discharge manifold channel is arcuate.

* * * * *